United States Patent
Suominen

[19]

[11] Patent Number: 6,069,913
[45] Date of Patent: May 30, 2000

[54] METHOD AND APPARATUS FOR DETERMINING AN IDENTIFYING BIT SEQUENCE IN A RADIO FREQUENCY WAVEFORM

[75] Inventor: Edwin A. Suominen, Phoenix, Ariz.

[73] Assignee: Radio Frequency Systems Inc., Marlboro, N.J.

[21] Appl. No.: 08/915,168

[22] Filed: Aug. 20, 1997

[51] Int. Cl.[7] .............................. H04B 15/00; H04K 1/00; H04L 27/30
[52] U.S. Cl. ............................................ 375/147; 375/343
[58] Field of Search ................................... 375/208, 209, 375/210, 343, 147; 708/422, 425

[56] References Cited

U.S. PATENT DOCUMENTS

| | | | |
|---|---|---|---|
| 3,961,172 | 6/1976 | Hutcheon | 235/181 |
| 5,132,985 | 7/1992 | Hashimoto et al. | 375/200 |
| 5,406,586 | 4/1995 | Wang | 375/343 |
| 5,500,872 | 3/1996 | Kinney et al. | 375/208 |
| 5,539,783 | 7/1996 | Papson | 375/355 |
| 5,596,329 | 1/1997 | Searle et al. | 342/374 |
| 5,621,770 | 4/1997 | Zastera | 375/347 |
| 5,784,403 | 7/1998 | Scott | 375/207 |
| 5,901,189 | 5/1999 | Rose | 375/368 |

*Primary Examiner*—Don N. Vo
*Assistant Examiner*—Phuong Phu
*Attorney, Agent, or Firm*—Ware, Fressola, Van der Sluys & Adolphson LLP

[57] ABSTRACT

The characterization and detection of an identifying bit sequence is performed without digital demodulation or bit synchronization. A waveform containing a digital bit sequence is correlated with waveforms corresponding to a set of known bit sequences. For each bit sequence, one of the inputs to a correlator is shifted through all possible values of correlation lag while the correlation match for each lag value is compared to the others so that a peak correlation between the two waveforms is determined. The peak correlation values for each of the known bit sequences are then compared to characterize how closely the received radio frequency signal corresponds to each of the known bit sequences. The bit sequence that most closely corresponds to the waveform of the received signal may then be identified. Applications include the identification of the N-AMPS DSAT and the GSM training sequence in a cellular radio scanning receiver.

19 Claims, 8 Drawing Sheets

METHOD AND APPARATUS FOR DETERMINING AN IDENTIFYING BIT SEQUENCE IN A RADIO FREQUENCY WAVEFORM

BACKGROUND OF THE INVENTION

This invention relates to the determination of an identifying bit sequence in a radio frequency (RF) waveform and, more particularly, to the asynchronous detection and determination of such an identifying bit sequence without digital demodulation.

The Narrowband Advanced Mobile Phone Service (N-AMPS) and the Global System for Mobile-telecommunication (GSM) cellular radio standards use identifying bit sequences to identify signals as belonging to a particular cell. The base station for a cell determines the identifying bit sequence of a received signal to verify that the received signal has the expected bit sequence for that cell. If the received signal does not contain the expected bit sequence, the signal is rejected as being an interfering signal belonging to a neighboring cell. Although the term bit may suggest a strictly binary digit, this term is to be understood as also including a multi-level symbol used by higher-order modulation.

Currently, an identifying bit sequence is determined by demodulating an RF waveform containing a digital bit sequence into a sequence of bits, which is then compared to an expected bit sequence. Such a digital demodulation requires that the samples entering the digital demodulator be synchronized with the bit rate. To acquire synchronization, the demodulator must monitor the signal for a period of time. In a weak and fading environment, too much time may elapse before a reliable and accurate synchronization is achieved.

The information provided by an identifying bit sequence is most important in the adverse environments that make synchronization difficult and unreliable; decisions that rely on this information need to be made quickly, before already poor-quality connections become completely unusable. What is needed is a way to determine an identifying bit sequence without having to perform digital demodulation, and so avoiding the difficulties in having to synchronize the demodulator with the bit rate of the identifying bit sequence.

SUMMARY OF THE INVENTION

To determine an identifying bit sequence, the present invention performs analog correlation of the received RF waveform containing the identifying bit sequence with RF waveforms corresponding to bit sequences known to be used as identifying bit sequences.

One of the inputs to the correlator for performing the analog correlation is shifted through all possible values of correlation lag while the correlation match for each lag value is compared to the others and the peak correlation between the two waveforms is determined. The peak correlation values for each of the known bit sequences are then compared to determine to which of the known bit sequences the identifying bit sequence of the received RF waveform corresponds.

Because no digital demodulation is performed, the bits of the digital sequence need not be synchronized to the samples of the digitized waveform. The waveform containing the digital bit sequence to be identified must simply correspond to one of the reference waveforms used in the correlation. There is no requirement that the sample rate of the digitized waveform have any exact relationship to the bit rate of the digital sequence. It is only important that the Nyquist frequency, i.e. one half the sampling rate, of the digitized waveform be high enough to contain most of the power spectrum of the digital sequence. This requirement can usually be met with a minimum of wasted signal processing if the Nyquist frequency is more than twice but less than four times the bit rate.

The reference waveforms are easily obtained by monitoring signals having the known bit sequence that will be associated with a particular reference waveform. They can then be combined into a permanent record for all future use of one or more receivers. These waveforms may be acquired as part of a production test, recording them with the particular scanning receiver that will be referencing them in field use. Alternatively, a single set of reference waveforms may be acquired during development of the receiver design, to be encoded into the non-volatile memory of all devices used in determining identify bit sequences.

The invention is particularly suitable for the identification of N-AMPS cellular radio signals. An N-AMPS signal is identified with a bit sequence that is the digital equivalent of the supervisory audio tone (SAT) used to identify AMPS signals. Because bandwidth is more restricted in an N-AMPS signal however, a low-bandwidth digital identifying signal is used instead of the analog SAT identifier used by AMPS. The bit sequence used in N-AMPS is called the digital supervisory audio tone (DSAT). There are seven such sequences, each consisting of a repeating series of 24 bits at 200 BPS.

Synchronizing a digital demodulator to such a low-rate bitstream requires a delay that is undesirably long for a scanning receiver. The present invention mitigates this problem by allowing consistently accurate detection of the DSAT within a fixed 120 msec time interval, even under noisy conditions that would make synchronization impractical in such a short time interval.

The present invention is also suitable for identification of a GSM signal, which uses for identification a 26-bit training sequence similar to the DSAT identifier found in an N-AMPS signal.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
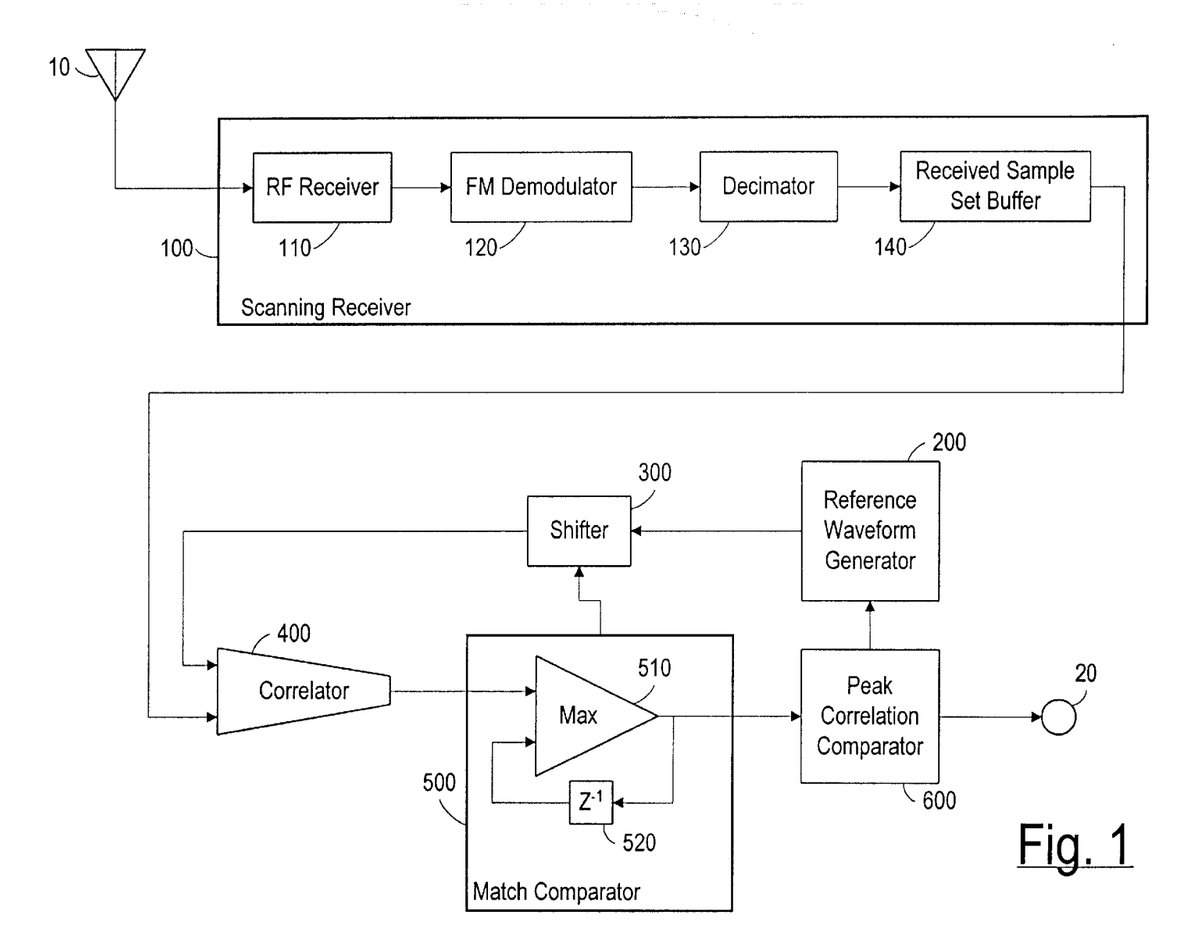
FIG. 1 is a schematic block diagram showing an embodiment of the invention wherein the correlation lag is produced by shifting the reference waveform.

The invention will be described first with respect to a preferred embodiment, shown in FIG. 1, which is configured to determine identifying bit sequences in N-AMPS cellular radio signals. An RF signal from an antenna 10 is received by a scanning receiver 100. Within the scanning receiver 100, an RF receiver section 110 selects out an RF waveform containing the identifying bit sequence to be determined. A suitable RF receiver is disclosed in commonly owned, copending patent application with Ser. No. 08/788,241, which is hereby incorporated by reference. The output of RF receiver section 110 is a digital representation of the RF waveform containing the identifying bit sequence to be determined, down-converted to a lower frequency where digital signal processing (DSP) operates efficiently. Preferably, the signal at the output of section 110 is represented by I and Q digital signals, having a center frequency at baseband. The remaining sections of the preferred embodiment shown in FIG. 1 are implemented to use digital signal processing (DSP).

Figure 3:
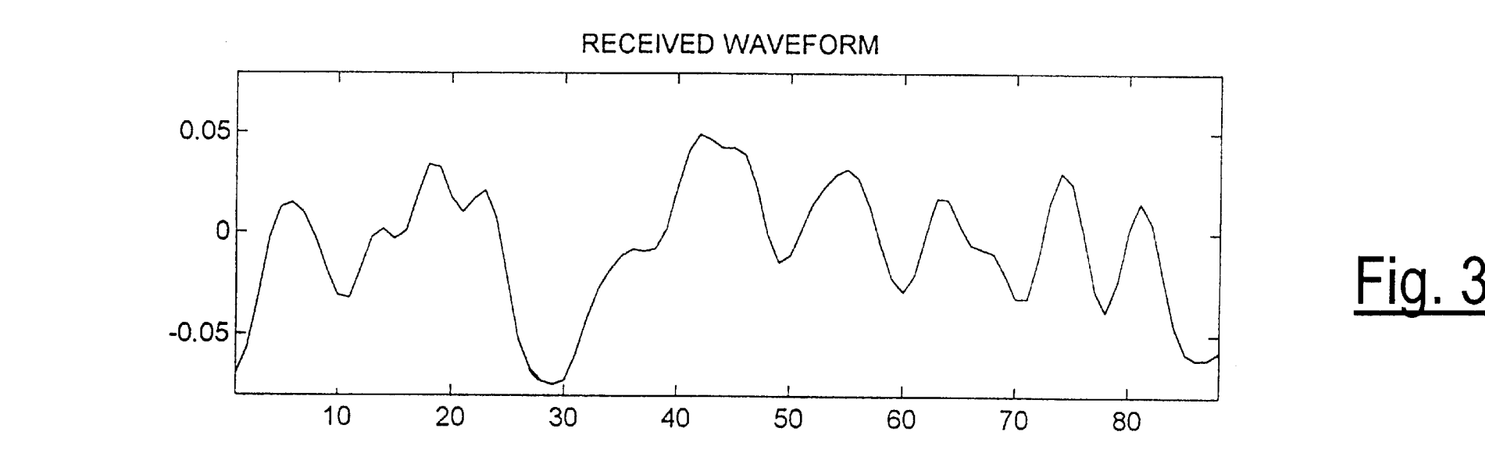
FIGS. 3 and 4, respectively, are plots of a received waveform corresponding to a noisy DSAT sequence and a matched reference waveform corresponding to the same DSAT sequence.

Samples of the RF waveform containing the identifying bit sequence (without digital demodulation) are stored in a buffer 140 as a set of digitized values. A plot of such a waveform is shown in FIG. 3. The samples may be derived from the received RF waveform in a manner appropriate to the type of modulation used.

In an N-AMPS application, the samples are derived by passing the received RF waveform through an FM demodulator 120 and then through a decimator 130. FM demodulator 120 does not perform digital demodulation of a bit sequence; it extracts from the FM modulated signal a component waveform corresponding to the digital modulation of the identifying bit sequence. N-AMPS signals use a 24-bit DSAT as an identifying bit sequence. This bit sequence is encoded onto the N-AMPS signal as a low-frequency component of the FM modulation. The waveform corresponding to this bit sequence is generated by passing the signal of interest through FM demodulator 120. U.S. Pat. No. 4,090,145, hereby incorporated by reference, discloses a suitable FM demodulator.

The DSAT is designed to occupy the frequency spectrum below the voice frequencies. FM demodulator 120 must operate at a high enough sample rate to accommodate both the DSAT and the highest voice frequencies. The receiver disclosed in referenced patent application Ser. No. 08/788, 241 produces a narrow-bandwidth output signal (designed for use with N-AMPS) at a sample rate of 23.4375 kHz. Thus the sample rate of the signals entering and leaving FM demodulator 120 is considerably higher than the sample rate of the signal entering buffer 140.

Decimator 130 reduces the sample rate while filtering out higher frequencies that would alias into the Nyquist bandwidth of the signal at the lower sample rate. Several design constraints are important in deciding how much to reduce the sample rate. One consideration is that a decimator is most efficiently implemented with a decimation rate that is a power of two. Another consideration is that substantially all of the power spectral density (PSD) of the bit sequence should lie within the Nyquist bandwidth of the decimated signal. Finally, the amount of storage required in buffer 140 is proportional to the sample rate of the decimated signal. Thus the decimated sample rate should be minimized.

A decimation rate of 32 effectively meets all of these requirements. The decimated sample rate is approximately 732 Hz. The PSD of the DSAT has a main lobe that rolls off to a null at about 200 Hz (the bit rate), with a minor lobe at 300 Hz. This is within the Nyquist bandwidth of 366 Hz. A 120 msec interval can be recorded with 88 samples at this low sample rate.

Decimator 130 is implemented in two stages. The first stage uses a simple add-and-dump implementation of an 8-tap moving average filter to decimate the input sample rate by eight. The second stage uses a 32-tap finite impulse response (FIR) filter with decimation by four. This filter may be designed to have a raised-cosine response with an excess bandwidth of $\beta=1$, matched to the 200 Hz bit rate of DSAT. Coefficients $\alpha_t$ for this filter may be generated from the following equations:

$t_s = 1/200$, $\beta=1$, and $$a_t = \frac{\sin(\pi t/t_s)}{\pi t/t_s} \cdot \frac{\cos(\pi t/t_s)}{1-(2\beta t/t_s)^2}.$$

where range variable t spans the time interval of the 32 filter taps. Since there are an even number of filter taps, there is no "center" value of t. However, the range of t is centered about zero.

The digitized samples in buffer 140 are taken from a single interval of the received signal and then stored. All analysis following buffer 140 is performed on the stored samples, so that the RF receiver section 110 can begin tuning to a different signal once the samples have been acquired.

The sample set stored in buffer 140 is correlated with a reference waveform by a correlator 400. Reference waveform generator 200 produces a set of digital samples representing the modulation that would be produced by an expected bit sequence. A shifter 300 shifts the sample set from generator 200 by a selected correlation lag before it reaches correlator 400. Correlator 400 computes the sum of the products between the two sample sets feeding it. A detailed example of correlation between an actual received waveform and a set of reference waveforms is described below with respect to FIGS. 3–12.

The reference waveforms generated by generator 200 are preferably acquired from actual signals having the expected bit sequences by, for example, injecting signals having each of the expected bit sequences into one receiver during its development. From the output of this receiver, samples of a reference waveform for each of known bit sequence are acquired in buffer 140. The reference waveform samples can then be combined into a permanent record for all future use of one or more receivers. Alternatively, reference waveforms unique to each receiver may be acquired as part of a production test. In either case, a set of reference waveforms is ultimately stored in non-volatile memory, so that reference waveform generator 200 can provide each reference waveform sample set as needed.

The output of correlator 400 is sent to match comparator 500, which controls shifter 300 causing it to produce successive shifted outputs. A shift and correlation is done for each possible value of correlation lag in the range from zero (no shift) to the full length of the sample set being shifted. A match comparator 500 collects in turn successive outputs from the correlator 400, comparing, with the comparator 510, each new result to the previous result and storing the greater result in a delay 520. When correlations for the full range of correlation lags have been computed, the match comparator 500 sends the peak (most positive) correlation to a peak correlation comparator 600.

The peak correlation comparator 600 controls the reference waveform generator 200 to produce reference waveforms corresponding to each of the known bit sequences, and collects the successive outputs from the match comparator 500, identifying each peak correlation with the known bit sequence that produced it. After determining a peak correlation for the full range of correlation lags for each known bit sequence, the peak correlation comparator 600 locates the maximum (most positive) peak correlation produced by match comparator 500, identifies the known bit sequence that produced it, and indicates this known bit sequence at output 20.

According to the preferred embodiment of the present invention, the peak correlation comparator 600 compares the peak correlation values to characterize how closely the received radio frequency signal corresponds to each of the known bit sequences; the known bit sequence that most closely corresponds to the signal is then determined. Sometimes, a minimum-cost decision is made based on other factors than just the known bit sequence that most closely corresponds to the received signal. To facilitate more sophisticated decision methods, the peak correlation comparator 600 may also provide the relative amplitudes of several peak correlations on output 20, instead of equating a received identifying bit sequence with a particular expected sequence. An external decision maker, responsive to output 20, may make a minimum-cost decision based on these peak correlations as well as other factors. Such factors may include the probability of the received signal having each of the known bit sequences, or may include other measurements of the signal such as carrier amplitude and carrier-to-interference ratio.

For example, in a Rayleigh fading environment, an interfering signal may sporadically appear in the FM demodulation. The interfering signal will have a different bit sequence from that of the dominant signal. In making a minimum-cost decision based on the identifying bit pattern, it may be useful to know the relative levels of peak correlation with respect to several different reference waveforms. In this case, the relative amplitudes of several peak correlations may be provided to external decision-making means.

In an N-AMPS application, the received and reference sample sets are preferably 88 samples in length. Each correlation between these sample sets requires 88 multiply-accumulate operations in a DSP. With processing overhead, each of these multiply-accumulate operations requires about five DSP clock cycles. The correlation is performed for 88 successive correlation lags to produce a peak correlation for a single DSAT, requiring a total of (5×88)×88, or about 39,000 DSP clock cycles. In order to compute the peak correlation for all seven DSATs used in the N-AMPS system, 7×39,000 or about 271,000 DSP clock cycles are required; a DSP such as the ADSP-2101 running at 24 MIPS can compute the peak correlation for all seven DSATs in about 12 msec of uninterrupted processing time.

Figure 2:
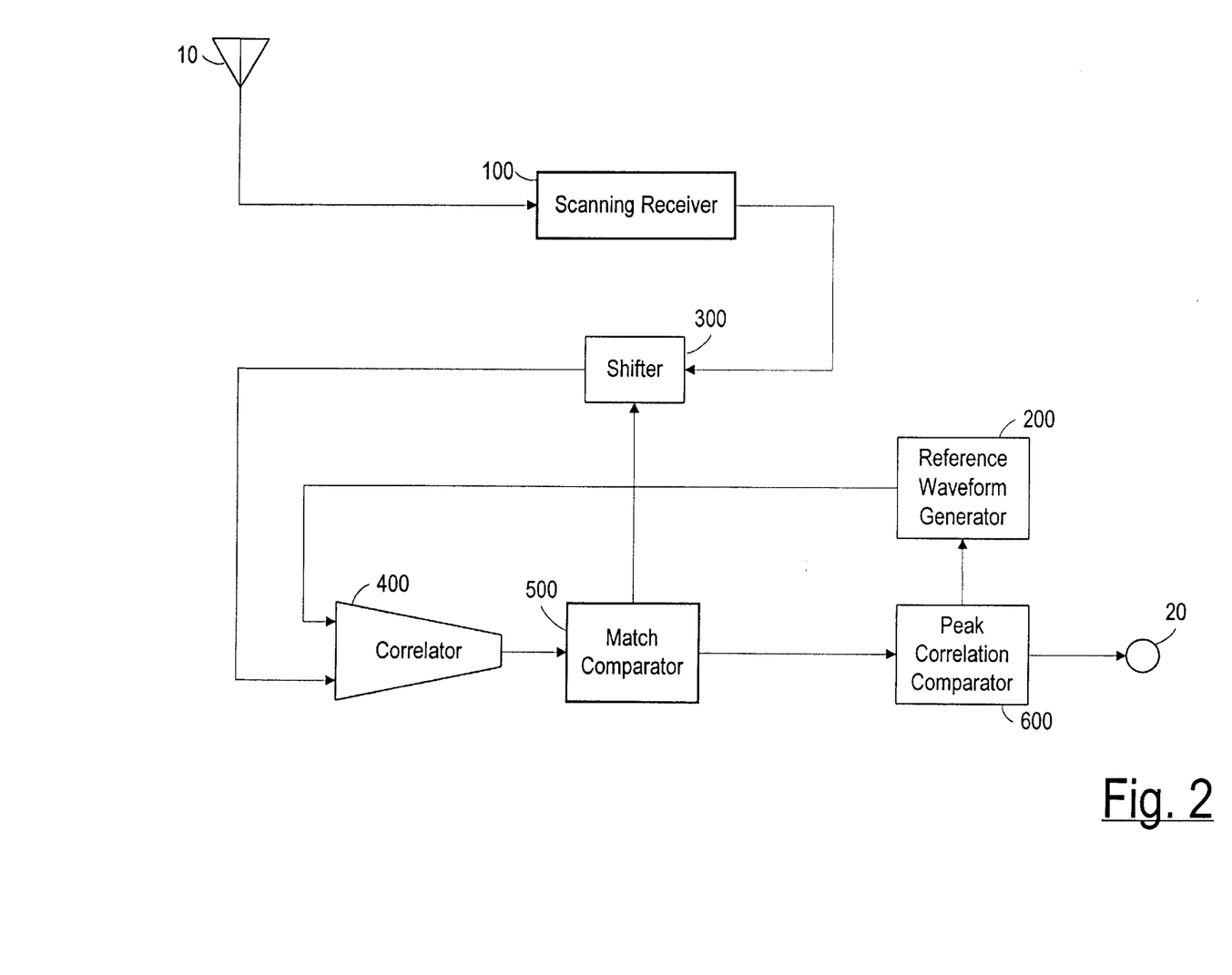
FIG. 2 is a schematic block diagram showing an embodiment of the invention wherein the correlation lag is produced by shifting the received waveform instead of by shifting the reference waveform.

Referring now to FIG. 2, in an alternative embodiment of the present invention the shifter 300 is coupled to the scanning receiver 100 instead of the reference waveform generator 200, and again under the control of the match comparator 500; here, the shifter is connected to receive samples from the received sample set buffer 140 within the scanning receiver 100 (see FIG. 1). With this configuration, the sample set of the received signal waveform is shifted instead of the sample sets of the reference waveforms.

Table 1 shows the bit sequences of each DSAT in the N-AMPS Cellular radio Standard. The invention also finds application in the characterization and detection of GSM signals, which use a 26-bit training sequence in the middle of the GSM normal burst is used as the identifying bit sequence; these bit sequences are also shown in Table 1.

In a GSM application, the sample sets in the correlation do not have the same length, because the training sequence is 26 bits long, while the normal burst is 148 bits long. To ensure that the training sequence is included in the received waveform, all 148 bits must be stored in the received sample buffer 140.

TABLE 1

The seven bit sequences of each DSAT in the N-AMPS Cellular radio Standard, and the eight bit sequences used as identifying bit sequences for GSM signals.

| DSAT No. | 24-Bit Sequence (Hex) | GSM Training Seq. No. | 26-Bit Sequence (Hex) |
|---|---|---|---|
| 1 | 2556CB | 1 | 0970897 |
| 2 | 255B2B | 2 | 0B77BB7 |
| 3 | 256A9B | 3 | 10EE90E |
| 4 | 25AD4D | 4 | 11ED11E |
| 5 | 26AB2B | 5 | 06B906B |
| 6 | 26B2AD | 6 | 13AC13A |
| 7 | 2969AB | 7 | 29F629F |
|   |        | 8 | 3BC4BBC |

The data bits sent before and after a GSM training sequence in a normal burst signal have random correlation with the training sequence. When the correlation window slides the reference waveform (corresponding to a particular training sequence) over the data portions of the normal burst, no strong correlation is produced. Because the training sequence is a relatively short part of the normal burst, the match comparator 500 needs to collect an additional block of correlations unrelated to the identifying bit sequence. However, the identifying bit sequence is still detected because, at some point, a correlation lag will be used that properly matches the reference waveform with the portion of the received waveform containing the training sequence. The match comparator 500 will send the peak correlation resulting from this match to the peak correlation comparator 600.

GSM uses a type of frequency modulation with digital signals, called Gaussian Minimum Shift Keying (GMSK). A GSM embodiment of the invention also uses the FM demodulator 120 and the decimator 130 (see FIG. 1) to provide a waveform containing the digital modulation. The lowpass filtering of the decimator 130 has a Gaussian frequency response rather than the raised-cosine preferably used in the N-AMPS application. Although one skilled in the GSM system will be familiar with the modulation used in GSM signals, a description may be found in *Microwave and RF Circuit Design for Wireless Communications*, by Lawrence E. Larson, Artech House, pp. 175–193, which pages are hereby incorporated by reference.

Figure 4:
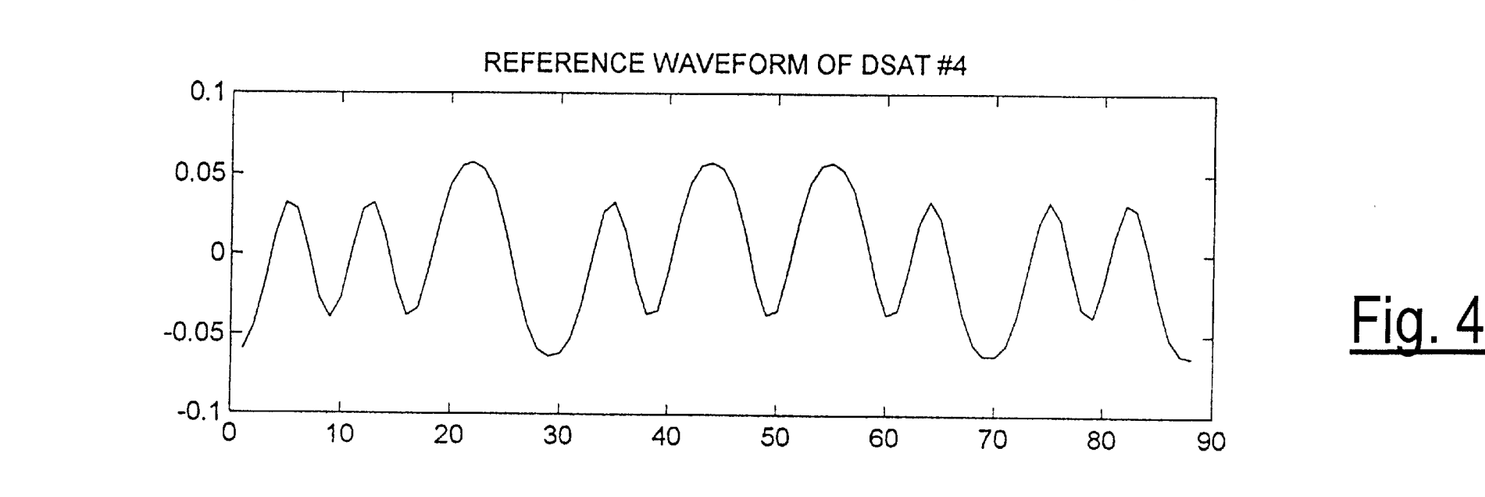
Figure 5:
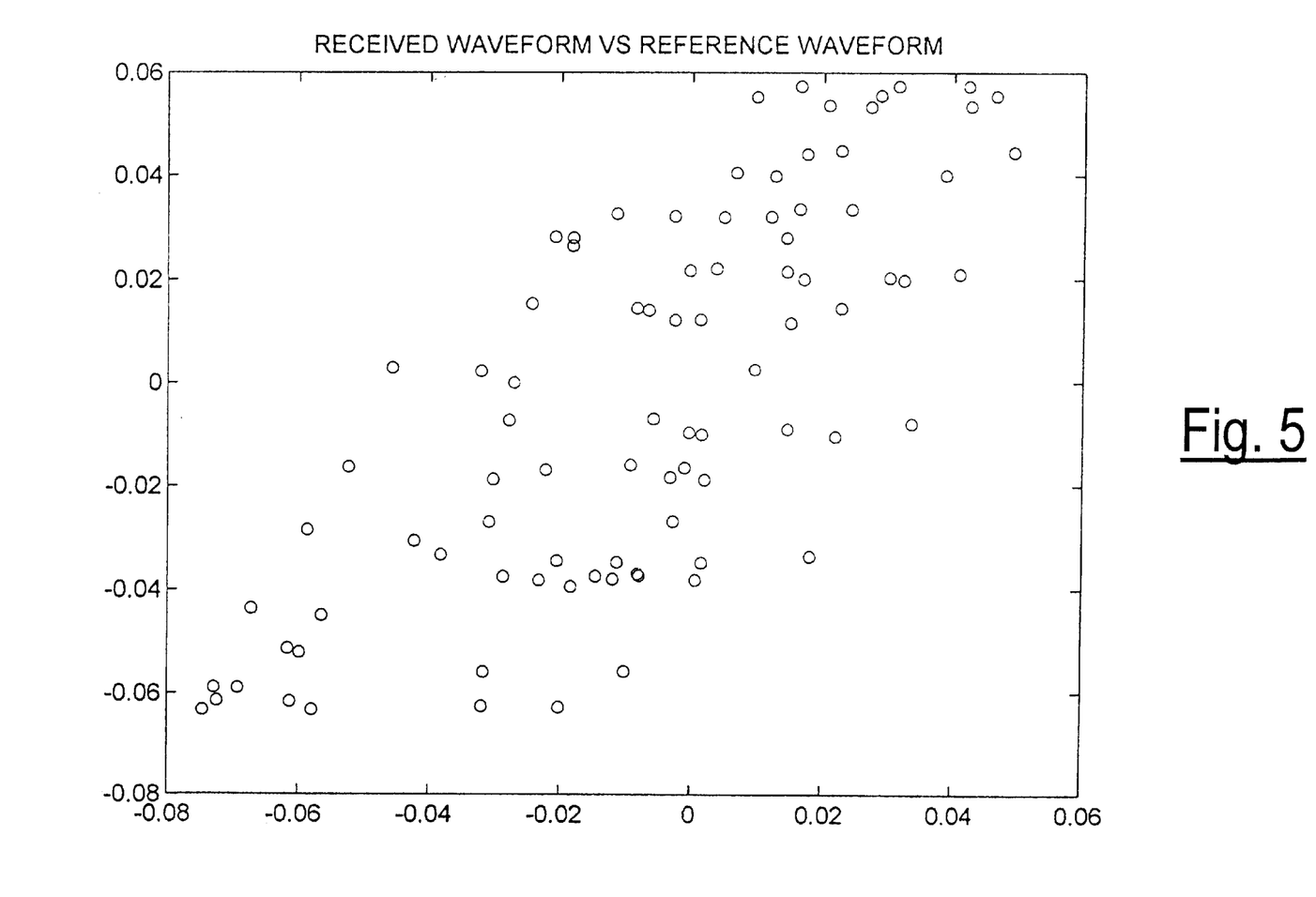
FIG. 5 is a scatter plot showing the correlation between the received and reference waveforms shown in FIGS. 3 and 4.

An example of N-AMPS operation of the invention will now be described with respect to FIGS. 3–12. FIG. 3 shows a received waveform stored in the received sample set buffer 140 (see FIG. 1). This waveform was acquired from a simulated N-AMPS signal with DSAT 4 of 7, having a bit sequence of 25AD4D (hex). The simulated signal was produced by an HP8921A cell site test set, without fading, at a 3 dB signal-to-noise ratio (SNR). A reference waveform corresponding to DSAT 4 with an identical time shift is shown in FIG. 4. FIG. 5 shows a scatter plot graphically depicting the noisy correlation between these two waveforms.

The received waveform of FIG. 3 shows substantial degradation from noise, making difficult the recovery of meaningful information by digital demodulation of the waveform. Reliable synchronization on such a brief interval of this noisy signal would likely be unfeasible. Despite the poor signal quality, the correlation between the waveforms of FIGS. 3 and 4 was sufficient to clearly identify the correct DSAT. Tests with nearly 20,000 other such received waveforms having the same low SNR resulted in an overall detection accuracy of 99.92%.

Figure 6:
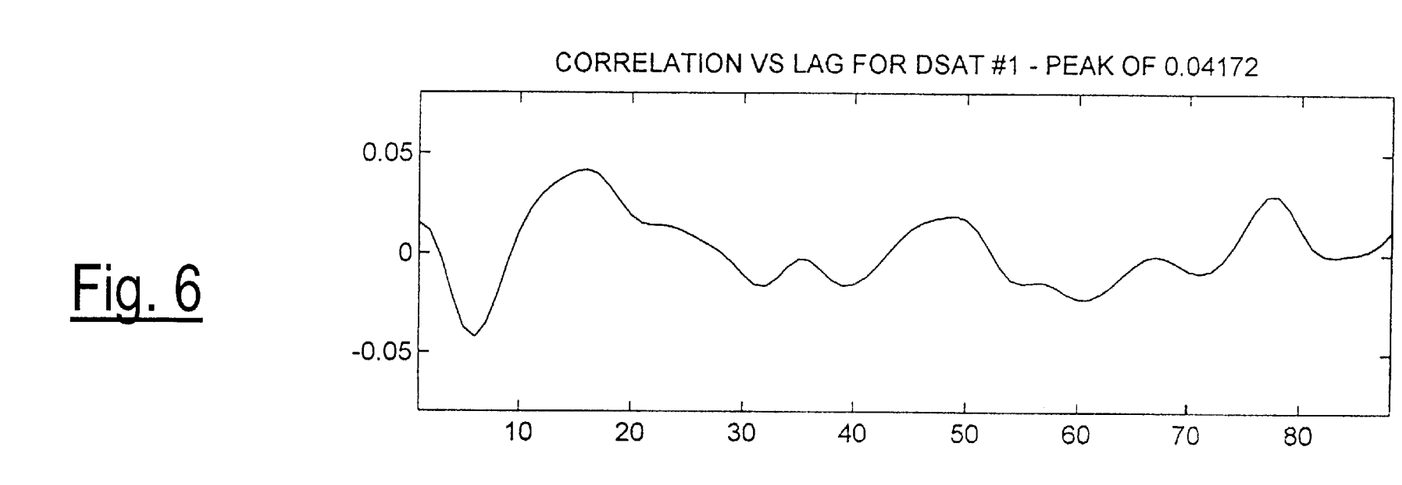
FIGS. 6–12 are correlogram plots of the received waveform shown in FIG. 3, correlated with reference waveforms corresponding to each of the seven DSAT sequences.
Figure 7:
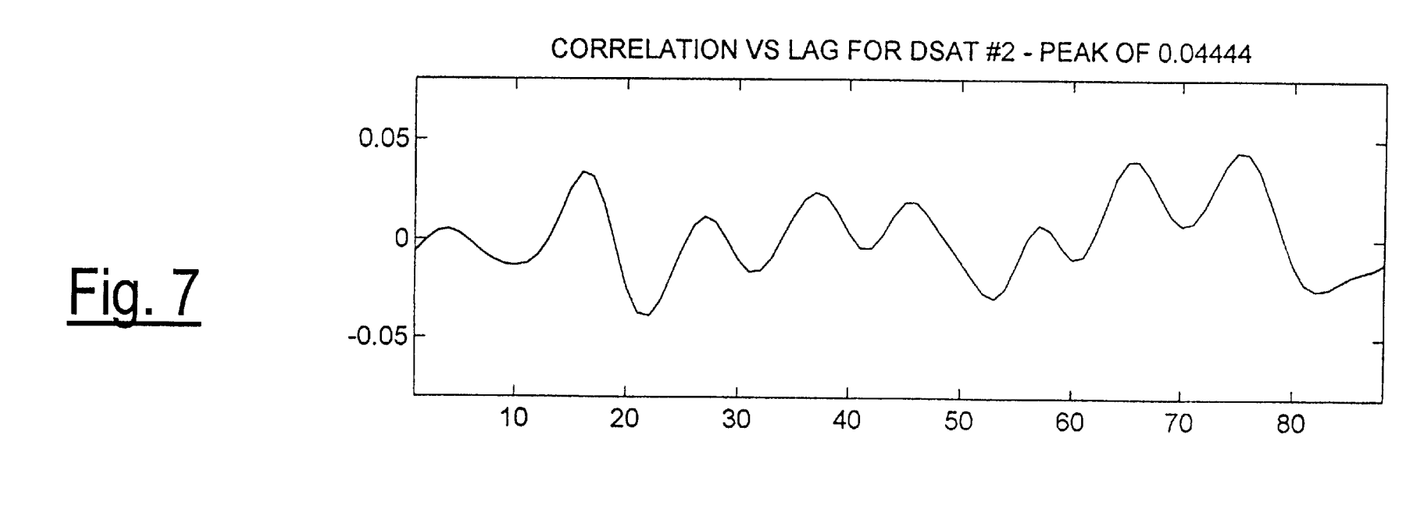
Figure 8:
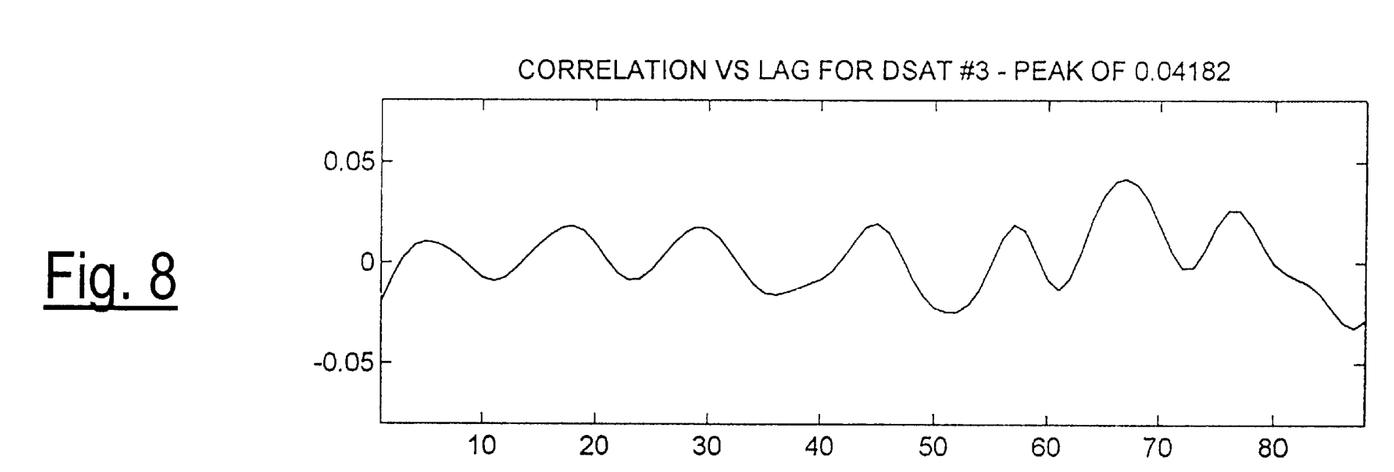

FIGS. 6–12 show correlogram plots of the received waveform of FIG. 3 correlated with reference waveforms corresponding to each of seven DSAT sequences. FIGS. 6–8, 10, 11 and 12 show that there is no distinct correlation peak between the received waveform and reference waveforms corresponding to DSATs 1–3, 5, 6 and 7, respectively. FIG. 6, for example, shows that the strongest correlation peak is about 0.04 between the received waveform and a reference waveform corresponding to DSAT 1.

Figure 9:
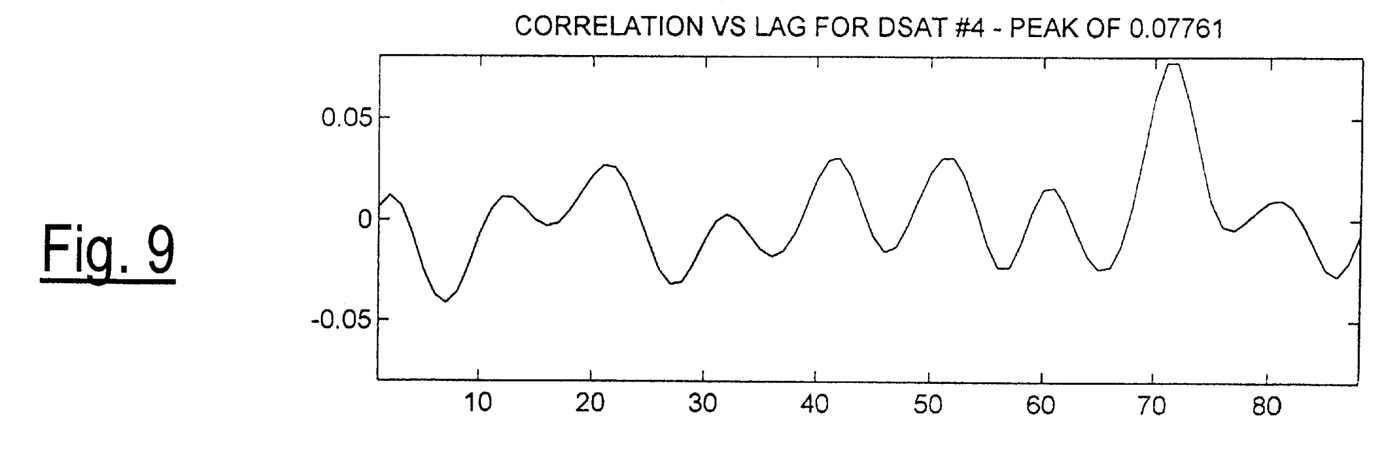
Figure 10:
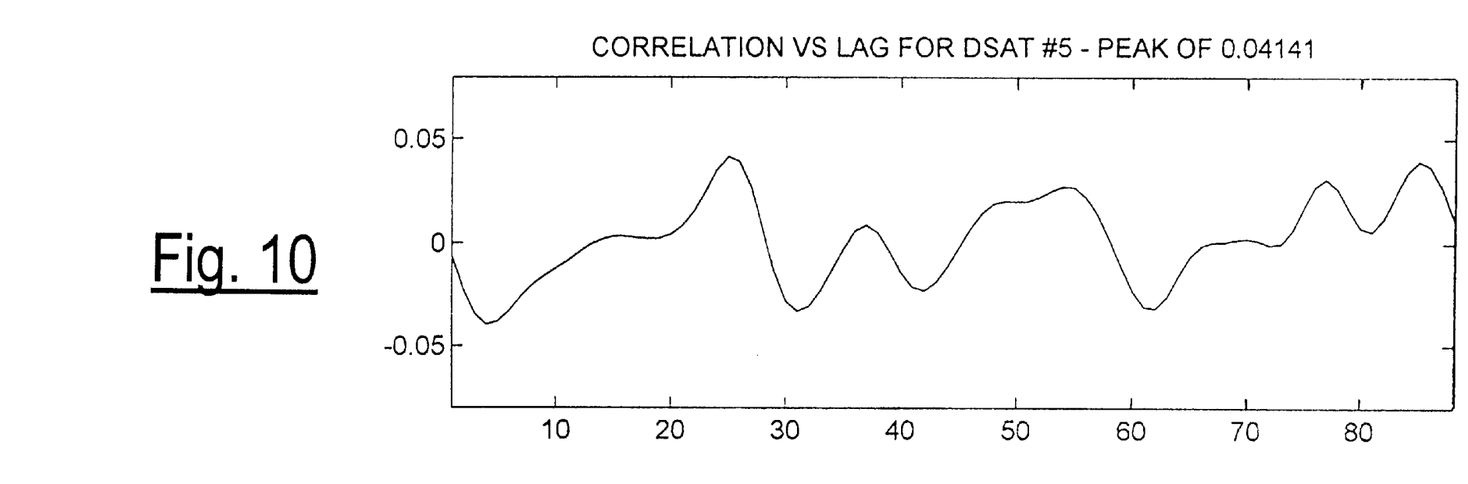
Figure 11:
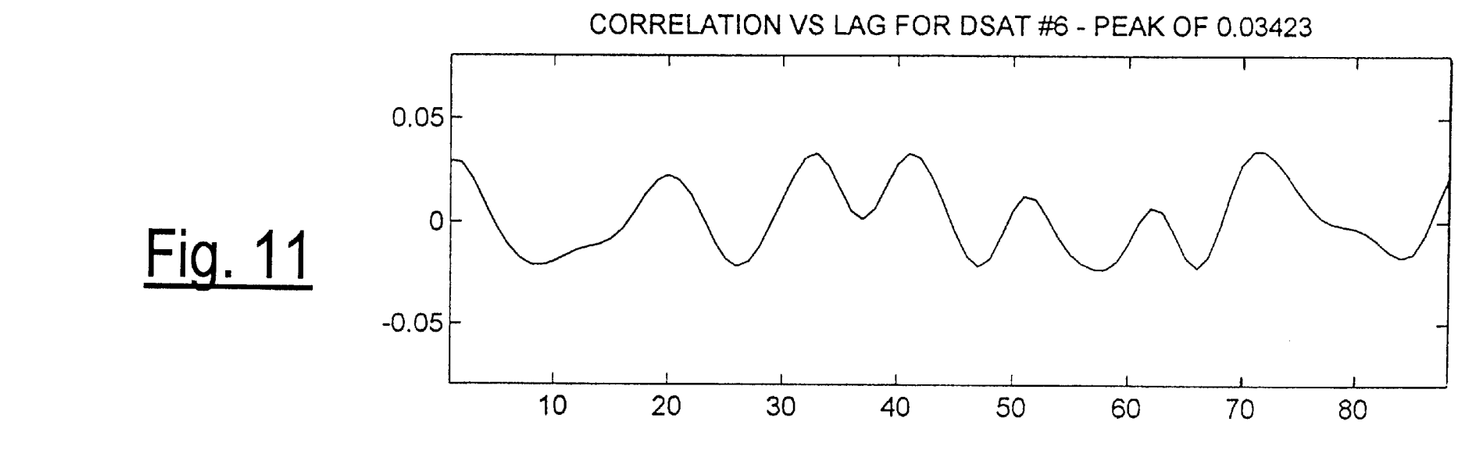
Figure 12:
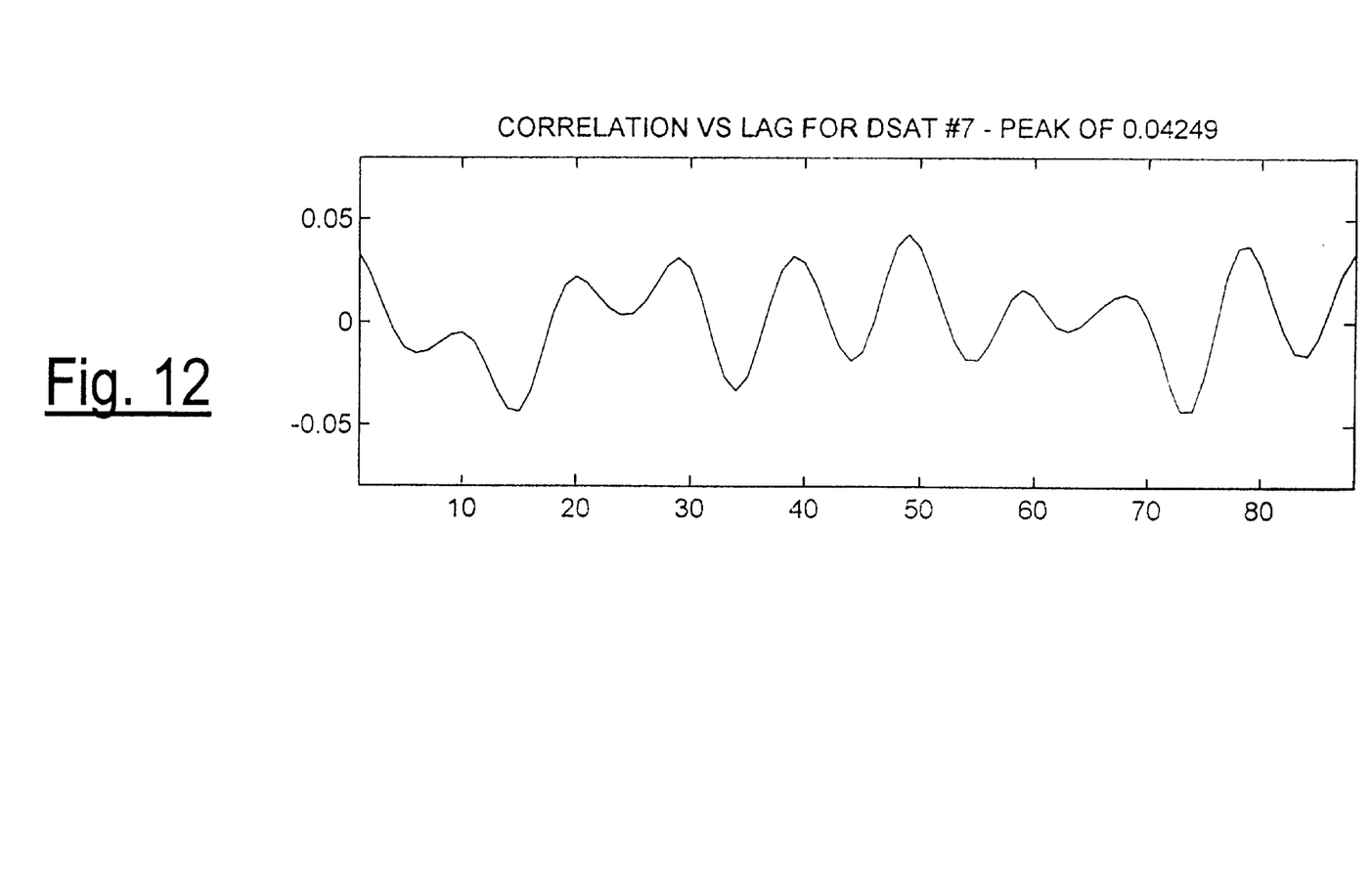

FIG. 9 shows a distinct correlation peak between the received waveform and a reference waveform corresponding to DSAT 4. The magnitude of this peak correlation is about 0.08, nearly double the peak correlation of any of the other waveforms. Even with a noisy received signal, the correlation provides a very strong indication of the DSAT of the received signal.

It is to be understood that the above-described arrangements are only illustrative of the application of the principles of the present invention. In particular, the present invention should not be construed to require that the received RF waveform be correlated with all known bit sequences; the process of determining an identifying bit sequence can terminate once a strong enough correlation with a known bit sequence is computed. Numerous other modifications and alternative arrangements may be devised by those skilled in the art without departing from the spirit and scope of the present invention, and the appended claims are intended to cover such modifications and arrangements.

What is claimed is:

1. An apparatus for characterizing an identifying bit sequence contained within a received radio frequency (RF) waveform in terms of a plurality of known bit sequences, the apparatus comprising:
   a) a scanning receiver for receiving in an RF waveform the identifying bit sequence and for determining samples of the received RF waveform containing the identifying bit sequence;
   b) a reference waveform generator for generating a plurality of reference sample sets each consisting of samples of a reference waveform characteristic of one of a plurality of known bit sequences;
   c) a correlator for computing, for each reference sample set in turn, the peak correlation with the received waveform sample set, the correlator determining the peak correlation by comparing each reference sample set to the received waveform sample set for a plurality of positions of the reference sample set relative to the received waveform sample set, so as to provide a comparison that is substantially independent of the phase of the reference sample set relative to the received waveform sample set; and
   d) a peak correlation comparator for comparing the computed peak correlation values to determine a maximum peak correlation and for providing the maximum peak correlation along with the known bit sequence giving rise to the maximum peak correlation.

2. An apparatus as claimed in claim 1, wherein the peak correlation comparator further provides the peak correlations computed for all of the known bit sequences and further indicates the known bit sequence giving rise to each provided peak correlation.

3. An apparatus as claimed in claim 1, further comprising a shifter, coupled to the reference waveform generator, for varying the phase of the received waveform samples relative to each of the reference sample sets by shifting each reference sample set over a predetermined range of shifted positions.

4. An apparatus as claimed in claim 1, further comprising a shifter, coupled to the scanning receiver, for varying the phase of the received waveform samples relative to each of the reference sample set by shifting the received waveform sample set over a predetermined range of shifted positions, the shifting performed for each reference sample set.

5. A device as claimed in claim 1, wherein the received waveform sample set is generated by determining samples at a frequency that is no less than four times and no greater than eight times the bit rate of the identifying bit sequence.

6. A device as claimed in claim 1, wherein the scanning receiver comprises:
   a) an RF receiver, for providing the received RF waveform;
   b) an FM demodulator, coupled to the output of the RF receiver, for demodulating the received RF waveform having the identifying sequence encoded as a low frequency component, to provide the low frequency component encoding the identifying sequence;
   c) a decimator, for decimating the low frequency component encoding the identifying sequence to allow for a lower sampling rate in creating the sample set of the received RF waveform; and
   d) a received sample set buffer responsive to the decimated signal, for providing the samples of the received RF waveform.

7. A device as claimed in claim 1, wherein at least one of the known bit sequences is a digital supervisory audio tone (DSAT) of an Narrowband Advanced Mobile Phone Service (N-AMPS) cellular signal.

8. A device as claimed in claim 1, wherein at least one of the known bit sequences is a training sequence of a Global System for Mobile-telecommunication(GSM) cellular signal.

9. A method for characterizing an identifying bit sequence contained within a received radio frequency (RF) waveform in terms of a plurality of known bit sequences, the method comprising the steps of:
   i) receiving in an RF waveform the identifying bit sequence and determining samples of the received RF waveform containing the identifying bit sequence;
   ii) generating a plurality of sample sets each consisting of samples of a reference waveform characteristic of one of a plurality of known bit sequences;
   iii) for each generated reference sample set in turn, computing the peak correlation with the received sample set by comparing each reference sample set to the received waveform sample set for a plurality of shifted positions of the reference sample set relative to the received waveform sample set, so as to provide a comparison that is substantially independent of the phase of the reference sample set relative to the received waveform sample set; and
   iv) comparing the computed peak correlation values to determine a maximum peak correlation and for providing the maximum peak correlation along with the expected bit sequence giving rise to the maximum peak correlation.

10. A method as claimed in claim 9, further comprising the step of providing the peak correlations computed for the other expected bit sequences and indicating the expected bit sequence giving rise to each provided peak correlation.

11. A method as claimed in claim 9 wherein the received waveform sample set is generated by determining samples at a frequency that is no less than four times and no greater than eight times the bit rate of the identifying bit sequence.

12. A method as claimed in claim 9 wherein at least one of the known bit sequences is a DSAT of an N-AMPS cellular signal.

13. A method as claimed in claim 9 wherein at least one of the known bit sequences is a training sequence of a GSM cellular signal.

14. A method as claimed in claim 9 wherein step i) further comprises the steps of:

FM demodulating the received RF waveform having the identifying sequence encoded as a low frequency component, to provide the low frequency component encoding the identifying sequence; and decimating the low frequency component encoding the identifying sequence to allow for a lower sampling rate in creating the sample set of the received RF waveform.

15. A device for characterizing an identifying bit sequence associated with a received radio frequency signal, comprising:

a) a scanning receiver, responsive to the received radio frequency signal, for providing a first sample set of digitized samples representing a waveform produced by at least one repetition of the identifying bit sequence;

b) a reference waveform generator for generating a second sample set of digitized samples representing a waveform produced by a selectable one of a plurality of known bit sequences, each of the known bit sequences being associated with a received radio frequency signal having a distinct identifying bit sequence;

c) a shifter, responsive to a sample set from the group consisting of the first sample set and the second sample set, for providing a third sample set, the third sample set being a replica of the selected sample set shifted by an offset of k digitized samples;

d) a correlator, responsive to the third sample set and a sample set from the first and second sample sets not coupled to the shifter, for providing, as an output, the correlation between the first and second sample sets of digitized signals with a correlation lag equal to the offset k;

e) a match comparator, controlling the shifter and collecting successive outputs from the correlator, for obtaining a peak correlation value for all values of k within the range from zero to the number of digitized samples in the third sample set; and f) a peak correlation comparator, controlling the reference waveform generator and collecting successive outputs from the match comparator, for comparing the peak correlation values for each of the known bit sequences to characterize how closely the received radio frequency signal corresponds to each of the known bit sequences.

16. A device as claimed in claim 15 wherein the peak correlation comparator determines which of the known bit sequences most closely corresponds to the received radio frequency signal.

17. A device as claimed in claim 15 wherein the shifter is coupled to the first sample set, and the correlator is responsive to the second sample set and the third sample set produced by the shifter.

18. A device as claimed in claim 15 wherein the shifter is coupled to the second sample set, and the correlator is responsive to the first sample set and the third sample set produced by the shifter.

19. A device as claimed in claim 15 wherein the scanning receiver further comprises:

an RF receiving stage, responsive to the received radio frequency signal and operative to substantially reject undesired signals;

an FM demodulator, coupled to the output of the RF receiving stage, for producing a demodulated signal; and a decimator, responsive to the demodulated signal, for reducing the sampling rate of the demodulated signal while rejecting undesired demodulated signals.

* * * * *